A. L. PUTNAM.
TIRE RIM.
APPLICATION FILED APR. 9, 1920.
1,419,170. Patented June 13, 1922.
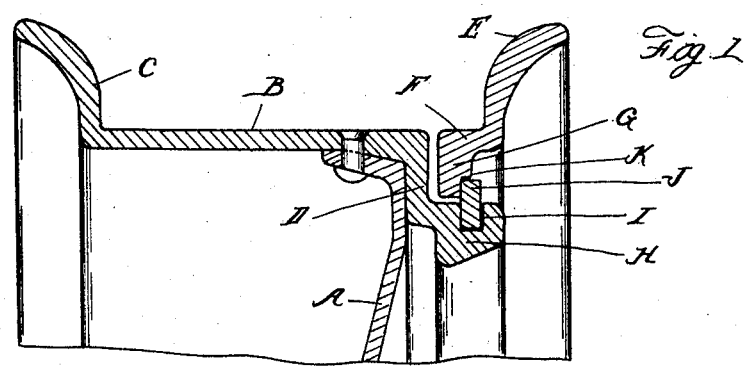
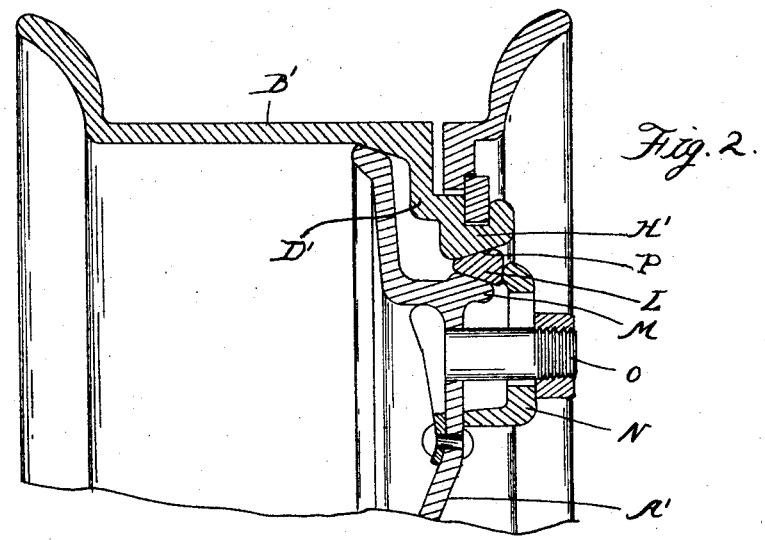
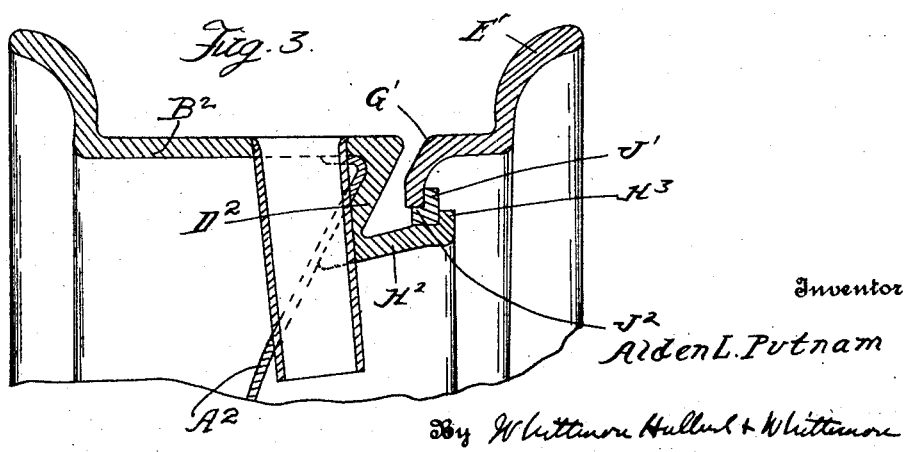
Inventor
Alden L. Putnam
By Whittemore Hulbert & Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF WILMINGTON, DELAWARE, A CORPORATION OF DELAWARE.

TIRE RIM.

1,419,170.  Specification of Letters Patent.  Patented June 13, 1922.

Application filed April 9, 1920. Serial No. 372,614.

*To all whom it may concern:*

Be it known that I, ALDEN L. PUTNAM, a citizen of the United States of America, residing at Detroit, in the county of Wayne and State of Michigan, have invented certain new and useful Improvements in Tire Rims, of which the following is a specification, reference being had therein to the accompanying drawings.

The invention relates to tire rims of that type in which one of the flanges of the rim is removable and is provided with locking means for holding the same in fixed relation to the cooperating portion of the rim. It is the object of the invention to facilitate the engagement and disengagement of the tire from the rim and to this end the invention consists in the novel construction of locking means as hereinafter set forth.

In the drawings:

Figure 1 is a cross-section through a non-demountable tire rim, to which my improvement is applied;

Figure 2 is a similar view showing a demountable construction of rim;

Figure 3 is a similar view showing a modified construction.

My improved construction is particularly applicable to rims which are mounted upon disk wheels, such being the construction specifically illustrated, but in its broader features the invention is not limited to this one type. As shown in Figure 1, A is the disk wheel, B is the rim section secured thereto and provided with a fixed flange C at one edge thereof. To secure the disk A to the rim it is usual to provide the latter with a radially inwardly extending flange, such as D, which forms a reinforcement for the portion of the disk immediately adjacent to the rim. I utilize this flange D for the further function of providing a locking means for the detachable flange and also thereby displacing or offsetting the locking means radially inward from the peripheral portion of the rim which engages the tire. This has the advantage that the rim is narrower so that the tire casing can be more readily placed thereon, or removed therefrom, and also the locking means cannot interfere with the tire during engagement or disengagement.

As shown, E is the detachable flange which is provided with a cylindrical portion F complementary to the rim B and with a radially inwardly extending flange G, which is parallel to the flange D. The flange D is provided with an outwardly extending flange H, which is formed with a groove I therein for receiving the split locking ring J overlapping the flange G. There is also provided a shouldered engagement between the split ring J and the flange G, indicated at K, such as to prevent radial outward movement of the ring from the groove I. This engagement may be broken by a lateral movement of the flange G towards the flange D and sufficient clearance is provided for such movement, so that the ring J may be easily inserted or removed from the groove I when the tire is deflated. On the other hand, when the parts are in engagement and the tire is inflated, the outward pressure against the flange E is such as to securely hold the ring J in engagement with the shoulder K, while the overlapping of the flange G by said ring J will retain the flange G from further outward displacement.

The construction illustrated in Figure 2 is the same as that of Figure 1, with the exception that the rim B' is demountably secured upon the disk A'. To this end the inner face of the flange H' is beveled, as indicated at P, to engage a wedge ring L, which latter also engages a tapered bearing M on the disk and is clamped by suitable means, such as the lugs N and clamping bolts O.

With the construction shown in Figure 3, the radially inwardly extending flange $D^2$ is at an angle to the plane of rotation of the wheel corresponding to the angle of the dished disk $A^2$, which is secured thereto. The outwardly extending flange $H^2$ terminates in a radially outwardly extending portion $H^3$ which forms a shoulder for the locking ring J'. This ring is of an angle cross-section having a portion $J^2$, which underlaps the inner edge of the depending flange G' on the tire retaining flange E'. Otherwise, the construction is the same as that shown in Figures 1 and 2 and the locking ring is engaged or disengaged when the tire is deflated by lateral movement of the flange E' relative to the fixed rim member.

In all of the various modifications, the locking means for the detachable flange is located in a position radially inward from the rim, where it avoids any interference with the tire and by narrowing the width of the fixed rim member facilitates the placing of the tire thereon, or the removal of it therefrom.

What I claim as my invention is:

1. The combination with a tire-holding rim having a fixed flange and a removable complementary flange, of a radially inwardly extending flange on said rim provided with a laterally outwardly-extending portion having a groove in its peripheral surface, a split locking ring for engaging said groove, and a radially inwardly-extending portion on said removable flange having a lateral play between said ring and said radially inwardly extending flange, affording clearance for removal of the locking ring in the inner limiting position of said play and in the opposite limiting position having locking engagement with said split ring to retain the latter in its groove.

2. The combination with a tire-holding rim having a fixed flange and a removable complementary flange, of a radially inwardly-extending flange on said rim provided with a laterally outwardly-extending portion having a groove in its peripheral surface, a split ring for engaging said groove, a radially inwardly-extending portion of said removable flange having a lateral play between said ring and said radially inwardly extending flange, affording clearance for removal of said ring in the inner limiting position of such play and in the opposite limiting position having shouldered engagement with said split ring for locking the latter from disengagement from the groove.

3. The combination with a tire-holding rim having a fixed flange and a removable complementary flange, of a radially inwardly-extending flange on said rim provided with a laterally outwardly-extending portion terminating in a radially outwardly-extending portion which forms a peripheral groove, a split locking ring for engagement with said groove, and a radially inwardly extending flange on said removable tire-holding flange, having a lateral play between said ring and said inwardly extending flange and having a shoulder for locking said ring from disengagement with its groove in the outer limiting position of said lost motion.

In testimony whereof I affix my signature.

ALDEN L. PUTNAM.